April 23, 1957  J. DOLZA ET AL  2,789,545
WINDSHIELD WIPER MOTOR
Filed Nov. 29, 1954  2 Sheets-Sheet 1

INVENTORS
John Dolza,
Harry W. Bielicki &
BY Earl R. Pierce
Paul Kilpatrick
ATTORNEY April 23, 1957 — J. DOLZA ET AL — 2,789,545
WINDSHIELD WIPER MOTOR
Filed Nov. 29, 1954 — 2 Sheets-Sheet 2
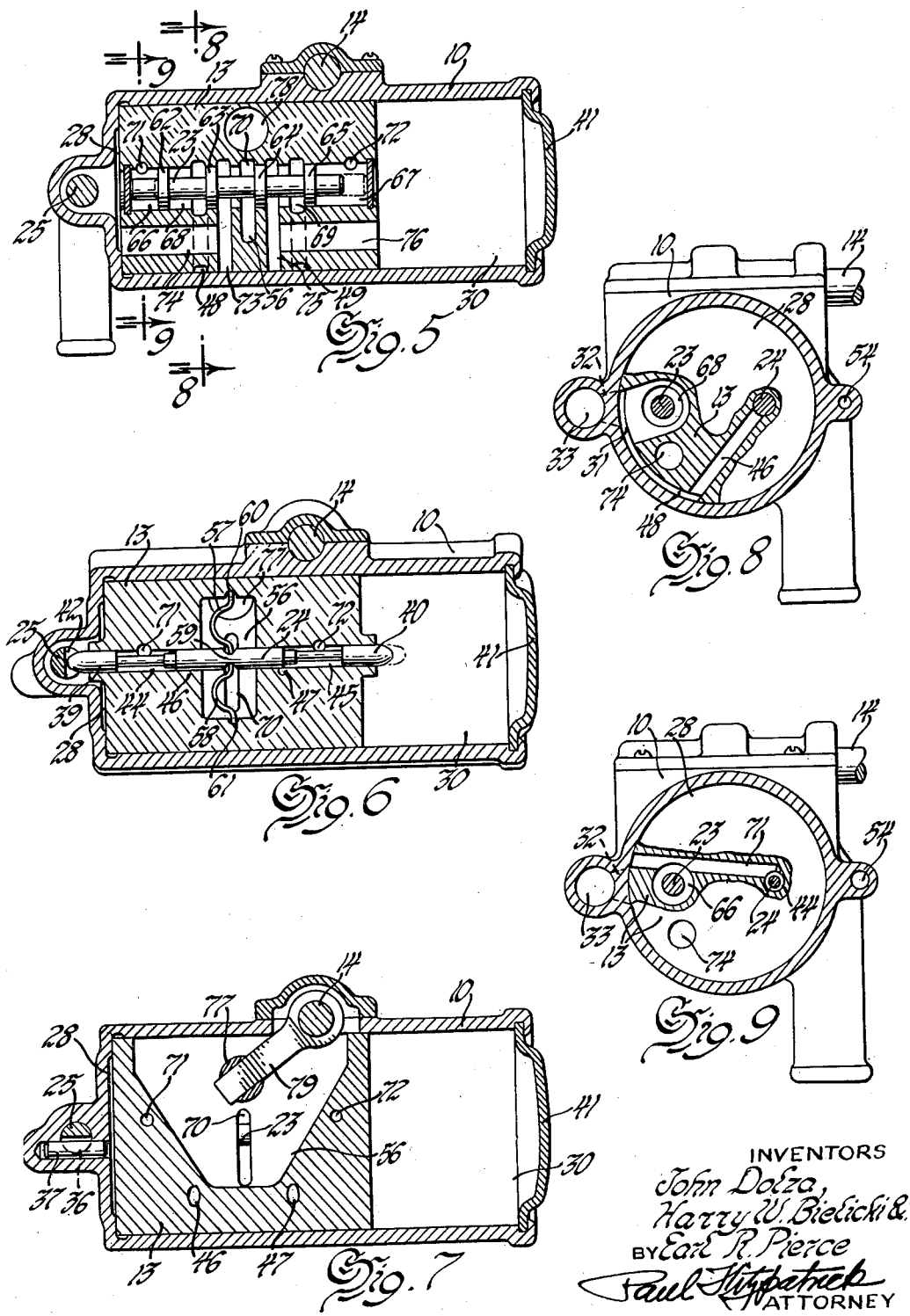
INVENTORS
John Dolza,
Harry W. Bielicki &
BY Earl R. Pierce
ATTORNEY the wiper motor comprises six major elements, namely, the housing 10, the piston 13, the drive shaft 14, a reverser valve 23, a shuttle valve 24 and a control valve 25.

2,789,545

WINDSHIELD WIPER MOTOR

John Dolza, Davisburg, Harry W. Bielicki, Detroit, and Earl R. Pierce, Birmingham, Mich., assignors to General Motors Corporation, Detroit, Mich., a corporation of Delaware Application November 29, 1954, Serial No. 471,652

14 Claims. (Cl. 121—123)

This invention relates to a servo mechanism and more particularly to a fluid operated windshield wiper motor.

An object of the invention is to provide a windshield wiper with a fluid operated servomotor of minimum size having means to vary the rate of windshield wiper oscillation and means to park the windshield wiper outside of the operating range of movement.

A further object of the invention is to provide the servomotor with an oscillating power take-off that has greater torque and lower speed at the oscillation boundaries than at the oscillation center.

Further objects and advantages of the invention will be apparent from the following description, reference being had to the accompanying drawings wherein a preferred form of the invention is clearly shown.

In the drawings:

Figure 5 is a vertical longitudinal section of the wiper motor taken substantially on the plane indicated by the line 5—5 of Figure 2;

Figure 6 is a vertical longitudinal section of the wiper motor taken substantially on the plane indicated by the line 6—6 of Figure 2;

Figure 7 is a vertical longitudinal section of the wiper motor taken substantially on the plane indicated by the line 7—7 of Figure 3;

Figure 8 is a vertical transverse section of the wiper motor partially broken away to the plane indicated by the line 8—8 of Figure 5; and Figure 9 is a vertical transverse section of the wiper motor partially broken away to the plane indicated by the line 9—9 of Figure 5.

Figure 1:
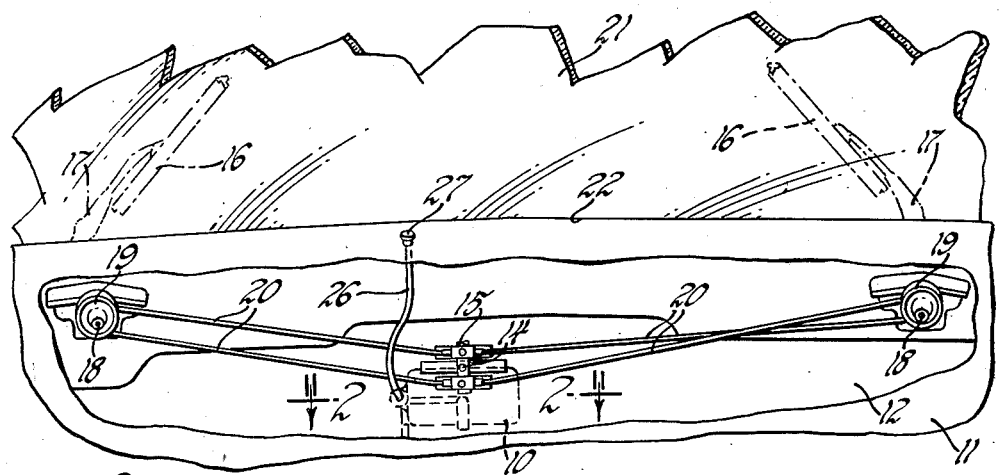
Figure 1 is a partial plan view of the forward interior of an automobile, partially broken away to illustrate the windshield wiping mechanism.
Figure 2:
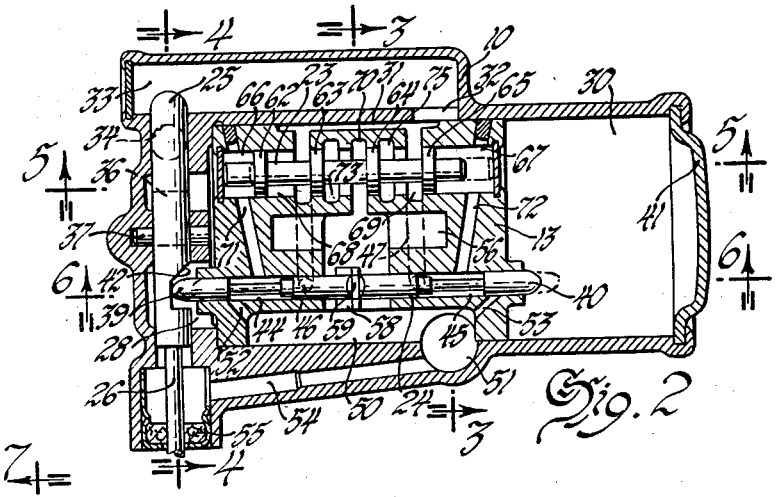
Figure 2 is a horizontal longitudinal section of the wiper motor in parked position taken substantially on the plane indicated by the line 2—2 of Figure 1.
Figure 3:
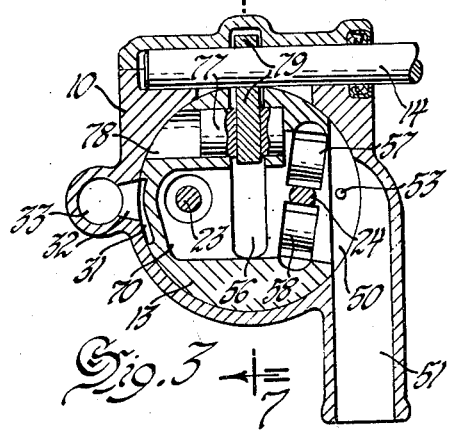
Figure 3 is a vertical transverse section of the wiper motor taken substantially on the plane indicated by the line 3—3 of Figure 2.
Figure 4:
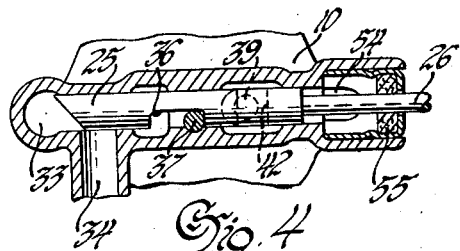
Figure 4 is a vertical transverse section of the wiper motor taken substantially on the plane indicated by the line 4—4 of Figure 2.

Referring particularly to Figure 1, the wiper motor includes a housing 10 secured behind the dashboard 11 to the engine side of the passenger compartment firewall 12. A piston 13 in the housing oscillates a drive shaft 14 that projects through the firewall to carry a conventional drive crank 15. Wiper blades 16 are mounted by wiper arms 17 onto drive shafts 18 that project through the cowl of the vehicle and carry pulleys 19 which connect by cables 20 to the drive crank 15 to oscillate the wipers in a predetermined arc on the windshield 21, the inner limits of the arc being a few inches above the lower windshield molding 22. The wipers park out of this range and against the molding to prevent their interfering with the operator's vision. Referring to the remaining figures, the wiper motor comprises six major elements, namely, the housing 10, the piston 13, the drive shaft 14, a reverser valve 23, a shuttle valve 24 and a control valve 25.

The wiper motor is shown in parked position and the piston 13 (which should be understood to include any suitable movable wall device) is motivated by alternatively supplying pressurized fluid, preferably oil from the engine, to one side of the piston while venting the other side. The reverser valve 23 and shuttle valve 24 are carried by the piston while the control valve 25 and drive shaft 14 are carried by the housing. The reverser valve is servo actuated by the shuttle valve to alternatively subject the opposite sides of the piston to the differential pressures to reciprocate the piston and the shuttle valve is mechanically actuated by engagement with the housing at the right end of piston stroke and by engagement with the control valve at the left end of piston stroke. The control valve is manually operated through a push-pull cable 26 and an operator's control knob 27 to meter pressurized oil at the desired rate to the reverser valve to provide speed control for the wipers. Movement of the control valve also parks the wipers by discontinuing engagement between the control valve and the shuttle valve at the left of piston stroke.

The piston 13 is received in a cylindrical bore in the housing 10 to form left and right power chambers 28 and 30. A longitudinal slot in the rear face of the piston skirt forms a fluid supply chamber 31 that communicates through a cylinder wall passage 32 with a longitudinal housing bore 33 throughout the stroke of the piston. A vertical housing bore 34 supplies the bore 33 with pressurized fluid at a rate determined by the position of the control valve 25 which is received in a transverse bore in the housing. A transverse slot 36 in the control valve forms a lost motion connection with a housing pin 37 to determine the range of control valve movement and it should be realized that the control valve supplies pressure fluid at a low rate while in park position, as shown, and at higher rates while in run position. The right side of the control valve engages the shuttle valve left end 39 when in run position to mechanically actuate the same toward the dash-dot position, the shuttle valve right end 40 being actuated by the housing cylinder cap 41 toward the full line position. A transverse groove 42 in the control valve clears the shuttle valve left end 39 from engagement with the control valve when the control valve is in park position, as shown, to stop the mechanical actuation of the shuttle valve. A longitudinal bore in the piston receives necked-in portions of the shuttle valve to form left and right servo supply chambers 44 and 45.

With the control valve in run position, the central portion of the shuttle valve alternatively opens and closes left and right transverse piston passages 46 and 47 that communicate with the fluid supply chamber 31 by way of left and right peripheral piston grooves 48 and 49 to alternatively feed pressure fluid to the servo supply chambers 44 and 45. A longitudinal slot in the front face of the piston skirt forms a fluid discharge chamber 50 that communicates with a vertical discharge passage 51 through the cylinder wall throughout the stroke of the piston. With the control valve in run position, the shuttle valve ends 39 and 40 alternatively open and close left and right transverse piston passages 52 and 53 to alternatively drain the servo supply chambers 44 and 45 to the fluid discharge chamber 50. With the control valve in park position, as shown, the servo supply chamber 44 is vented to the fluid discharge chamber 50 and the servo supply chamber 45 is pressurized from the fluid supply chamber 31. A longitudinal bore 54 in the housing drains the cable end of the control valve to the discharge passage 51 and a seal 55 prevents fluid leakage along the cable. The central portion of the piston is hollowed out to provide a transverse cavity 56 that communicates with the fluid discharge chamber 50. The shuttle valve extends through the cavity 56 and a pair of U-shaped toggle springs 57 and 58 engage a necked-in central portion 59 of the shuttle valve and bear against notches 60 and 61 in the walls of the cavity to shift the shuttle valve to left (solid) or right (dash-dot) position on each mechanical actuation.

A longitudinal piston bore that is plugged at each end embraces spaced lands 62, 63, 64 and 65 on the reverser valve 23 to form left and right servo chambers 66 and 67, left and right pressure supply chambers 68 and 69 and a central exhaust chamber 70. With the control valve in run position, the reverser valve has left and right movement in the piston as shown by the dash-dot and solid lines. This takes place because the reverser valve servo chambers 66 and 67 communicate by left and right transverse piston passages 71 and 72 with the alternatively pressurized shuttle valve servo supply chambers 44 and 45 thereby throwing the reverser valve left and right with left and right movement of the shuttle valve. The reverser valve pressure supply chambers 68 and 69 communicate by left transverse and longitudinal passages 73 and 74 and by right transverse and longitudinal passages 75 and 76 with the piston power chambers 28 and 30 to alternatively pressurize the power chambers on reciprocation of the reverser valve, the power chambers being alternatively drained through the central exhaust chamber 70 that communicates with the cavity 56 and the passages 73, 74, 75 and 76. With the control valve in position, as shown, the right piston power chamber 30 is pressurized and the left piston power chamber 28 is drained. The running stroke of the piston is approximately ⅛ inch inward from the ends of the cylinder and the piston travels beyond the running stroke and into engagement with the left end of the cylinder on parking. The over-center biasing of the shuttle valve by the toggle springs 57 and 58 makes this condition possible as the shuttle valve ends need only be lightly triggered by their engagement with the control valve and cylinder cap to initiate movement of the shuttle valve by the toggle springs. This extra movement of the piston outside of its normal running stroke parks the windshield wipers outside of their running range of oscillation.

The reciprocatory movement of the piston is transmitted to the drive shaft 14 to impart oscillatory movement thereto through a trunnion 77 journaled in a transverse bore 78 in the piston and provided with a diametrical passage that slidably receives a lever 79 suitably fixed on the drive shaft. The transverse cavity 56 opens longitudinally along the upper face of the piston skirt to receive the lever 79. Disregarding fluctuations in oil pressure due to changes in engine speed, the hydraulic force that is applied to the piston is constant throughout the piston stroke and the piston speed is likewise constant if fluctuations in wiper load are disregarded. The drive shaft 14, however, due to the particular drive connection between the shaft and piston, oscillates with increasing torque and decreasing speed from the center of oscillation. The drive connection between the shaft 14 and the piston 13 is constituted by trunnion 77 and lever, or crank arm, 79. As the piston 13 reciprocates within the cylinder 10, the length of the crank arm 79 between the trunnion 77 and the shaft 14 varies. In particular, the length of the crank arm 79 is longer at the ends of the piston stroke than in the center of the piston stroke, thereby resulting in increased torque at the stroke ends of the shaft 14 and a decreased speed. In other words, as the length of the crank arm between the trunnion 77 and the shaft 14 increases adjacent the ends of the piston stroke, the torque transmitted to the shaft 14 likewise increases since torque is the product of force and distance. The speed will decrease since as the length of the crank arm 79 between the piston 13 and the shaft 14 increases, the piston will travel throughout a greater distance at the ends of the stroke than in the center of the stroke to effect a like angular movement of the shaft 14. The wiper blades 16 will therefore have greater torque at their boundaries of oscillation where pile-up of snow or ice might tend to stall them and the wipers will also decelerate as they approach their boundaries of oscillation to eliminate objectionable "wiper slap."

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

We claim:

1. A wiper motor including in combination, a cylinder, a piston disposed in the cylinder capable of fluid pressure actuation in either direction, valve means operatively associated with the piston and actuated due to movement thereof for directing pressure fluid to said cylinder on opposite sides of said piston so as to effect continuous piston movement throughout a running stroke, said valve means being carried by the piston and movable relative thereto for controlling the application of pressure fluid to said cylinder on opposite sides of said piston, and a manually operable valve for varying the rate of fluid flow to said valve means to control the speed of motor operation and to park the piston outside of said running stroke.

2. A wiper motor including in combination, a cylinder, a piston disposed in the cylinder capable of fluid pressure actuation in either direction, servo actuated reversing valve means carried by the piston and movable relative thereto for directing pressure fluid to said cylinder on opposite sides of said piston so as to effect continuous piston movement, and means operable to prevent servo actuation of said reversing valve means in one direction so as to increase the stroke of said piston and interrupt motor operation, said last recited means including a manually operable valve for controlling motor operation.

3. A wiper motor including in combination, a cylinder, a shaft rotatably journaled in said cylinder, a reciprocable piston disposed in the cylinder capable of fluid pressure actuation in both directions, servo actuated reversing valve means carried by said piston and movable relative thereto for directing pressure fluid to said cylinder on opposite sides of said piston so as to effect continuous piston reciprocation, means operatively interconnecting said piston and said shaft for imparting oscillation to said shaft upon reciprocation of said piston, and a manually operable valve for varying the rate of fluid flow to said reversing valve means to control the speed of motor operation and to park the piston outside of its running range of movement.

4. A wiper motor including in combination, a cylinder, a shaft rotatably journaled in said cylinder, a reciprocable piston disposed in the cylinder capable of fluid pressure actuation in both directions, servo actuated reversing valve means carried by said piston and movable relative thereto for directing pressure fluid to said cylinder on opposite sides of said piston so as to effect continuous piston reciprocation, means operatively interconnecting said piston and said shaft for imparting oscillation to said shaft upon reciprocation of said piston, and means operable to prevent servo actuation of said reversing valve means in one direction so as to increase the stroke of said piston and interrupt motor operation.

5. A wiper motor including in combination, a cylinder, a shaft rotatably journaled in said cylinder, a reciprocable piston disposed in the cylinder capable of fluid pressure actuation in both directions, servo actuated reversing valve means carried by said piston and movable relative thereto for directing pressure fluid to said cylinder on opposite sides of said piston so as to effect continuous piston reciprocation, means operatively interconnecting said piston and said shaft for imparting oscillation to said shaft upon reciprocation of said piston, and means operable to prevent servo actuation of said reversing valve means in one direction so as to increase the stroke of said piston and interrupt motor operation, said last recited means including a manually operable valve for controlling motor operation.

6. A wiper motor including in combination, a cylinder, a reciprocable piston disposed in the cylinder capable of fluid pressure actuation in both directions, a reversing valve carried by said piston and capable of fluid pressure actuation in both directions relative to said piston, said reversing valve controlling the application of pressure fluid to said cylinder and opposite sides of said piston so as to effect continuous piston movement throughout a running stroke, said cylinder being formed with a pressure supply passage and a drain passage having communication with said piston and said reversing valve irrespective of the position of the piston within the cylinder, and means to render said reversing valve inoperative to reverse the application of pressure fluid adjacent one end of the running stroke to extend the stroke of the piston and park the piston outside of its running stroke.

7. A wiper motor comprising a housing, a piston reciprocable therein, a servo actuated reversing valve reciprocable in the piston between first and second positions for subjecting opposite sides of the piston to differential pressures in alternate directions to reciprocate the same, a shuttle valve reciprocable in the piston between first and second positions on engagement with the housing at either end of the running stroke of the piston for servo actuating the reversing valve, and a toggle-action holding spring for retaining the shuttle valve in the first and second positions.

8. A wiper motor comprising a housing, a piston reciprocable therein, valve means carried by the piston and actuated by engagement with the housing at either end of the running stroke of the piston for subjecting opposite sides of the piston to differential pressures in alternate directions to reciprocate the same, and valve means carried by the housing for controlling the speed of piston operation and for parking the piston outside of the running range of movement.

9. A wiper motor comprising a housing, a piston reciprocable therein, a reverser valve reciprocable in the piston for subjecting opposite sides of the piston to differential pressures in alternate directions to reciprocate the same, a shuttle valve reciprocable in the piston for reciprocating the reverser valve actuated at either end of piston stroke, and a control valve reciprocable in the housing for directing the flow of fluid to the reverser and shuttle valves to control the speed of piston operation and to park the piston outside of its running range of movement.

10. A wiper motor comprising a housing, a piston reciprocable therein, means carried by the piston and actuated at either end of its running stroke for subjecting opposite sides of the piston to differential pressures in alternate directions to reciprocate the same, and means carried by the housing for controlling the speed of piston operation and for parking the piston outside of its running range of movement.

11. A wiper motor comprising a housing, a piston reciprocable therein, a reverser valve reciprocable in the piston for subjecting opposite sides of the piston to differential pressure in alternate directions to reciprocate the same, a shuttle valve reciprocable in the piston for reciprocating the reverser valve and actuated at either end of the piston stroke, and a control valve reciprocable in the housing for directing the flow of fluid to the reverser and shuttle valves and movable to prevent actuation of the shuttle valve adjacent one end of the piston stroke to park the piston outside of its running stroke.

12. A wiper motor comprising a housing, a piston reciprocable therein, a reverser valve reciprocable in the piston for subjecting opposite sides of the pistons to differential pressures in alternate directions to reciprocate the same, a shuttle valve reciprocable in the piston for reciprocating the reverser valve, and a control valve in the housing for directing the flow of fluid to the reverser and shuttle valves, said shuttle valve being reciprocable between said first and second positions on engagement with the housing at one end of the running stroke of the piston and on engagement with said control valve at the other end of the running stroke of the piston, said control valve having a grooved portion movable into alignment with said shuttle valve so as to prevent engagement between the shuttle valve and the control valve adjacent said other end of the running stroke of the piston to park the piston outside of its running stroke.

13. A wiper motor comprising a housing, a piston reciprocable therein, a reverser valve reciprocable in the piston for subjecting opposite sides of the piston to differential pressures in alternate directions to reciprocate the same, a shuttle valve reciprocable in the piston for reciprocating the reverser valve, and a control valve reciprocable in the housing transversely with respect to said piston, said shuttle valve being reciprocable between said first and second positions on engagement with said control valve at one end of the running stroke of the piston and on engagement witth the housing at the other end of the running stroke of the piston, said control valve including a grooved portion, which when moved into alignment with said shuttle valve prevents movement thereof at said one end of the running stroke of the piston to park the piston outside of its running stroke.

14. A fluid motor including in combination, a cylinder, a piston disposed in the cylinder capable of fluid pressure actuation in either direction, servo actuated reversing valve means carried by the piston and movable relative thereto for directing pressure fluid to said cylinder on opposite sides of said piston so as to effect continuous piston movement, and means operable to prevent servo actuation of said reversing valve means in one direction so as to extend one stroke end position of said piston and interrupt motor operation with the piston at said extended stroke end position.

References Cited in the file of this patent

UNITED STATES PATENTS

| 257,280 | Blessing | May 2, 1882 |
| 1,142,551 | Burnhart | June 8, 1915 |
| 1,370,003 | Brigger | Mar. 1, 1921 |
| 1,623,028 | Barett et al. | Mar. 29, 1927 |
| 1,663,666 | Moskovitz et al. | Mar. 27, 1928 |
| 1,667,559 | McCaleb | Apr. 24, 1928 |
| 2,098,936 | Armstrong et al. | Nov. 16, 1937 |
| 2,251,240 | Kellogg | July 29, 1941 |
| 2,543,686 | Brown | Feb. 27, 1951 |
| 2,584,229 | Sacchini | Feb. 5, 1952 |
| 2,609,796 | Sivacek | Sept. 9, 1952 |
| 2,621,634 | Carey | Dec. 16, 1952 |
| 2,632,196 | Rappl | Mar. 24, 1953 |
| 2,661,726 | Alifieri | Dec. 8, 1953 |

FOREIGN PATENTS

| 363,973 | Germany | Nov. 16, 1922 |